United States Patent [19]

Gou et al.

[11] Patent Number: 5,301,215

[45] Date of Patent: Apr. 5, 1994

[54] NUCLEAR REACTOR BUILDING

[75] Inventors: Perng-Fei Gou, Saratoga; Harold E. Townsend, Campbell, both of Calif.; Giancarlo Barbanti, Sirtori, Italy

[73] Assignee: General Electric Company, San Jose, Calif.

[21] Appl. No.: 981,731

[22] Filed: Nov. 25, 1992

[51] Int. Cl.⁵ .............................. G21C 9/004
[52] U.S. Cl. .................................. 376/283
[58] Field of Search ...................... 376/283, 293

[56] References Cited

U.S. PATENT DOCUMENTS

| | | | |
|---|---|---|---|
| 3,718,539 | 2/1973 | West et al. | 376/283 |
| 5,008,069 | 4/1991 | Fredell | 376/299 |
| 5,011,652 | 4/1991 | Tominaga et al. | 376/283 |
| 5,021,212 | 6/1991 | Kataoka et al. | 376/283 |
| 5,087,408 | 2/1992 | Tominaga et al. | 376/283 |
| 5,096,659 | 3/1992 | Hidaka et al. | 376/283 |
| 5,211,906 | 5/1993 | Hatamiya et al. | 376/283 |

FOREIGN PATENT DOCUMENTS

| | | | |
|---|---|---|---|
| 63-21595 | 1/1988 | Japan | 376/283 |
| 64-16991 | 1/1989 | Japan | 376/283 |
| 2-115793 | 4/1990 | Japan | 376/283 |

Primary Examiner—Daniel D. Wasil
Attorney, Agent, or Firm—J. S. Beulick

[57] ABSTRACT

A reactor building for enclosing a nuclear reactor includes a containment vessel having a wetwell disposed therein. The wetwell includes inner and outer walls, a floor, and a roof defining a wetwell pool and a suppression chamber disposed thereabove. The wetwell and containment vessel define a drywell surrounding the reactor. A plurality of vents are disposed in the wetwell pool in flow communication with the drywell for channeling into the wetwell pool steam released in the drywell from the reactor during a LOCA for example, for condensing the steam. A shell is disposed inside the wetwell and extends into the wetwell pool to define a dry gap devoid of wetwell water and disposed in flow communication with the suppression chamber. In a preferred embodiment, the wetwell roof is in the form of a slab disposed on spaced apart support beams which define therebetween an auxiliary chamber. The dry gap, and additionally the auxiliary chamber, provide increased volume to the suppression chamber for improving pressure margin.

16 Claims, 3 Drawing Sheets

NUCLEAR REACTOR BUILDING

The U.S. Government has rights in this invention in accordance with the Department of Energy Contract No. DE-AC03-90SF18494.

The present invention relates generally to nuclear reactors, and, more specifically, to a reactor building including a primary containment for a nuclear reactor contained therein.

BACKGROUND OF THE INVENTION

A conventional boiling water reactor (BWR) is contained in a reactor building which includes a containment vessel for preventing significant fission product release in the event of an accident. The containment vessel is typically a reinforced concrete containment vessel (RCCV) having a steel liner as a leakage barrier for containing radiation therein. The vessel walls are typically about two meters thick, and with the steel liner, are conventionally sized for containing a maximum pressure therein of about 55 psig (3.9 kg/cm$^2$), for example. The actual pressure within the containment vessel relative to the maximum design pressure of the containment vessel, e.g. 55 psig (3.9 kg/cm$^2$), is conventionally known as the pressure margin. As the pressure within the containment vessel increases during operation, the pressure margin therein necessarily decreases. Suitable margin must be maintained during all modes of operation including expected accidents which requires that the containment vessel have a predetermined thickness and pressure containing capability.

Typically disposed inside the containment vessel and circumferentially around the reactor is a conventional wetwell or pressure suppression pool containing demineralized water. Defined between the reactor and the wetwell within the containment vessel is a conventionally known drywell which is simply an air space or chamber which, during normal operation of the reactor, contains a gas such as air or nitrogen. During an accident event such as a loss-of-cooling-accident (LOCA), steam is discharged from the reactor pressure vessel or main steam line into the drywell and is conventionally channeled through a plurality of conventional horizontal vents which are disposed in flow communication with the wetwell pool. The released steam is condensed in the wetwell pool which, therefore, reduces its pressure for maintaining acceptable pressure margin.

A conventional BWR includes a substantial number of active systems which require external power for controlling operation of the reactor and the many safety systems therefor. In order to reduce the number of active systems, a simplified boiling water reactor (SBWR) is being developed which will have a power output of about 600 MWe, for example. The SBWR is being designed to use natural circulation and passive features to minimize dependence on mechanical components and operator action, especially for operation of standard safety features.

For example, the SBWR also includes a containment vessel having a wetwell or pressure containment pool to absorb energy releases from the pressure vessel. However, the SBWR wetwell is an enclosed annular chamber having a top or roof which is commonly known as a diaphragm floor in the form of a relatively thick steel enclosed concrete slab which provides the top enclosure for the wetwell as well as provides a floor for the elevated pool of the gravity driven cooling system (GDCS) disposed thereon and a floor to support drywell piping and equipment. In an emergency, the SBWR vessel is depressurized, and cooling water flows by gravity from the GDCS pool into the reactor vessel to cool the reactor core.

The volume of the SBWR reactor building is generally not less than the volume of conventional BWR reactor buildings for a comparable power output. However, a smaller reactor building is desirable to reduce its volume and therefore reduce material and construction costs, and also reduce the time of construction to provide substantial cost savings in the building of the plant.

Accordingly, the SBWR reactor building preferably has a predeterminedly, relatively small volume wherein the containment vessel has a predetermined outer diameter and height preselected for containing all required equipment and for obtaining acceptable performance of the various systems associated therewith. For example, the drywell defined within the containment vessel has a predetermined volume which is specifically related to the volume of the wetwell air chamber above the pool of water therein. During a LOCA, for example, steam released into the drywell is channeled through the horizontal vents into the wetwell pool for being condensed therein. The steam, however, carries with it a portion of the air within the drywell which is compressed within the wetwell air chamber above the wetwell pool as it accumulates therein. The boundary defining the wetwell, including the diaphragm floor and drywell, must, therefore, be suitably configured and sized for accommodating the expected pressures therein, and is typically designed for containing pressures up to about 55 psig (3.9 kg/cm$^2$), for obtaining a suitable pressure margin over the designed-for pressures therein. For the 600 MWe SBWR, the diaphragm floor has a thickness of about 1.6 meters and is encased within a steel liner, with the wetwell outer wall and floor being part of the containment vessel which is about 2 meters thick and steel lined. The wetwell inner wall is similarly sized for accommodating the expected pressures within the wetwell.

The wetwell is partially filled with water to a predefined level above the tops of the horizontal vents to provide acceptable operation thereof as is conventionally known. Accordingly, the wetwell air chamber above the wetwell pool has a predetermined volume which is preselected for accommodating the air entrained steam which is channeled through the horizontal vents into the wetwell pool, with the entrained air being compressed in the wetwell chamber during the LOCA, for example. This predetermined volume is constrained by the surfaces defining the wetwell air chamber which limits the pressure margin that may be obtained.

One manner of improving pressure margin in the wetwell during the LOCA, for example, would be to simply increase the size of the wetwell air chamber by increasing the height of the wetwell walls. However, this would also increase the height of the reactor vessel as well as that of the containment vessel, including the drywell, which would reduce the expected gain in pressure margin, as well as increase building materials and cost, and possibly penalize other plant systems which are related to building size. Similarly, if the wetwell air chamber diameter were increased, the containment vessel diameter would also increase which would increase the volume of the drywell. This, in turn, would lead to a further increase in wetwell pressure during the LOCA, and, therefore, less pressure margin.

OBJECTS OF THE INVENTION

Accordingly, one object of the present invention is to provide a new and improved reactor building having a containment vessel providing additional wetwell air chamber volume.

Another object of the present invention is to provide a reactor building having increased wetwell air chamber volume without increasing the diameter or height of the containment vessel.

Another object of the present invention is to provide an improved reactor building having increased pressure margin without increasing containment vessel size.

SUMMARY OF THE INVENTION

A reactor building for enclosing a nuclear reactor includes a containment vessel having a wetwell disposed therein. The wetwell includes inner and outer walls, a floor, and a roof defining a wetwell pool and a suppression chamber disposed thereabove. The wetwell and containment vessel define a drywell surrounding the reactor. A plurality of vents are disposed in the wetwell pool in flow communication with the drywell for channeling into the wetwell pool steam released in the drywell from the reactor, during a LOCA for example, for condensing the steam. A shell is disposed inside the wetwell and extends into the wetwell pool to define a dry gap devoid of wetwell water and disposed in flow communication with the suppression chamber. In a preferred embodiment, the wetwell roof comprises a slab disposed on spaced apart support beams which define therebetween an auxiliary chamber. The dry gap, and additionally the auxiliary chamber, provide increased volume to the suppression chamber for improving pressure margin.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
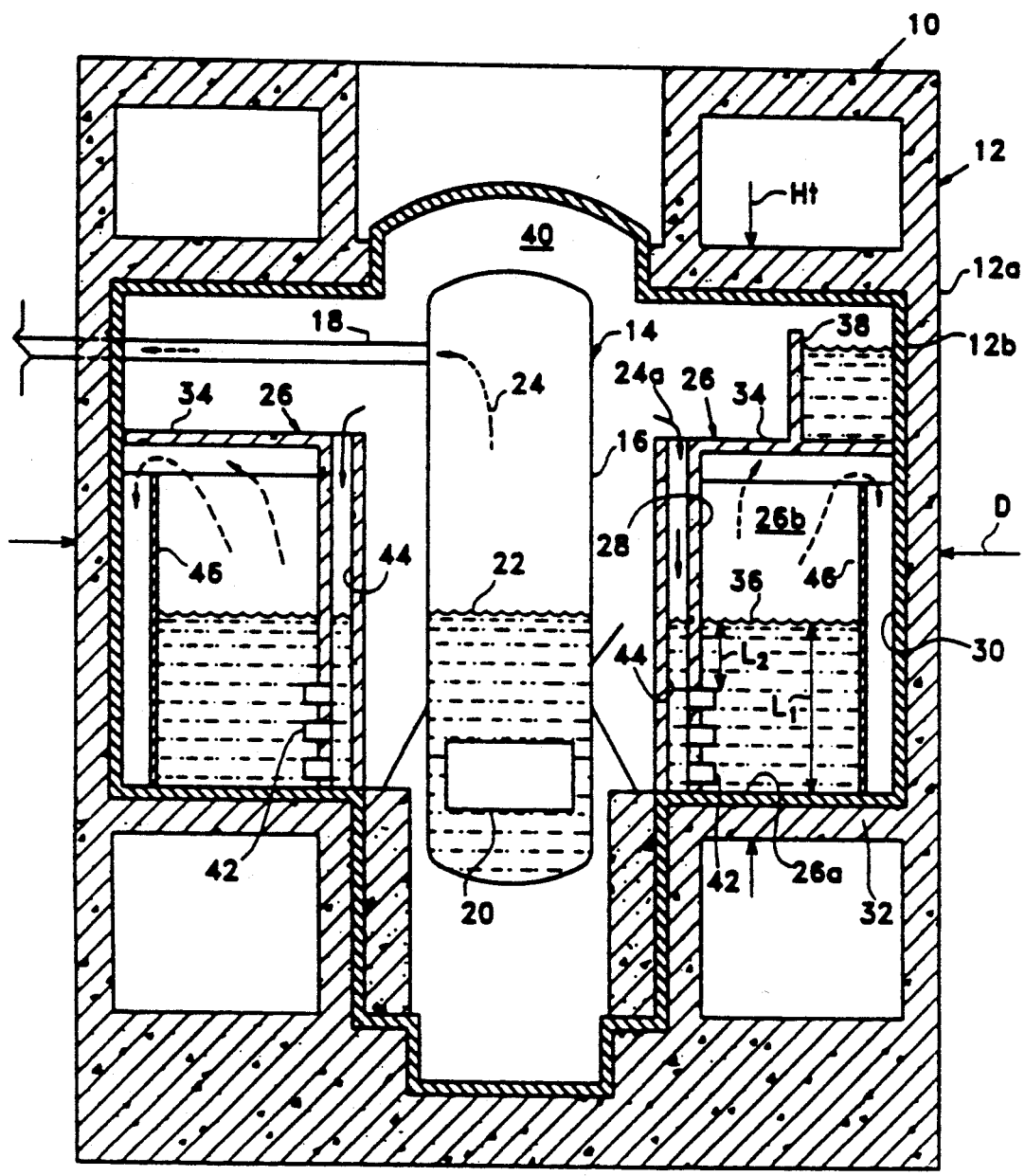
FIG. 1 is a schematic, elevational sectional view of an exemplary reactor building in accordance with one embodiment of the present invention.

Illustrated schematically in FIG. 1 is an exemplary reactor building 10 in accordance with one embodiment of the present invention. The building 10 includes a conventional containment vessel 12 which encloses a boiling water nuclear reactor 14 such as a simplified boiling water reactor (SBWR) for example. The reactor 14 includes a conventional reactor pressure vessel 16 conventionally supported in the building 10 and having a conventional main steam line 18 disposed in flow communication therewith and with a conventional steam turbine (not shown) for powering an electrical generator (not shown) for producing electrical power for a utility grid. The pressure vessel 16 includes a conventional reactor core 20 submerged in reactor water 22 which is conventionally effective for boiling the water 22 to generate steam 24 which is conventionally channeled through the main steam line 18 to the steam turbine. The reactor 14 may be sized, for example, for generating about 600 MWe in power.

The containment vessel 12 is annular and completely surrounds the reactor 14 on its sides, top, and bottom, and is sized and configured for preventing unacceptable radioactive leakage therefrom during an accident. For example, the containment vessel 12 includes a conventional concrete wall 12a and a conventional leak-tight steel liner 12b which extends along the inner surfaces of the concrete wall 12a. The containment vessel 12 is also conventionally known as a reinforced concrete containment vessel (RCCV).

Disposed inside the containment vessel 12 is an exemplary annular pressure suppression chamber or wetwell 26 which includes a radially inner vertical wall 28, a radially outer vertical wall 30, a horizontal floor 32, and a horizontal roof 34 which collectively define a wetwell pool 26a, containing wetwell water 36, and a wetwell air chamber 26b, or suppression chamber 26b, disposed directly above the wetwell pool 26a. The inner wall 28, commonly known as a vent-wall, and the outer wall 30 are annular walls disposed concentrically about a vertical centerline axis of the pressure vessel 16. In this exemplary embodiment, both the wetwell outer wall 30 and floor 32 are portions of the containment vessel 12. And, the wetwell roof 34, also known as a diaphragm floor, encloses the wetwell 26 as its top, and supports, for example, a commonly known gravity driven cooling system (GDCS) pool 38 containing cooling water therein, and provides support for drywell equipment and piping.

The wetwell 26 and the containment vessel 12 define a drywell 40 which surrounds the reactor 14 and is predeterminedly spaced therefrom to provide a dry volume surrounding the reactor 14 which is typically filled with a gas such as air or nitrogen. The drywell 40 is more particularly defined by the inner surfaces of the containment vessel 12 and the opposing outer surfaces of the wetwell inner wall 28 and roof 34, and is separated from the wetwell 26 by the inner wall 28 and roof 34.

The containment vessel 12 and wetwell 26 are predeterminedly configured and sized for the SBWR application, and, for example, the containment vessel 12 has a predetermined outer diameter D and a predetermined height Ht measured in a vertical plane through the wetwell 26. Since the GDCS pool 38 is disposed on top of the wetwell 26, along with additional conventional equipment and plumbing not shown, the wetwell 26 is necessarily shorter in height than the height Ht of the containment vessel 12 to provide suitable room therefor above the wetwell 26.

A plurality of vertically spaced apart horizontal vents 42 are disposed in the wetwell pool 26a and are submerged below the water level $L_1$ thereof in flow communication with the drywell 40. More specifically, the horizontal vents 42 are suitably joined in flow communication with the drywell 40 by an inlet conduit 44 which extends vertically through the wetwell inner wall 28, for example. A plurality of the conduits 44 are circumferentially spaced apart in the inner wall 28, with each conduit 44 being disposed in flow communication with respective pluralities of the horizontal vents 42. The horizontal vents 42 are provided for conventionally channeling from the drywell 40 to the wetwell 26 any steam which may be released from the reactor 14 either by a break in the main steam line 18 or other breaks in the pressure vessel 16 which may occur in an accident such as that conventionally known as a loss-of-cooling-accident (LOCA). The released steam, 24a, will then be channeled through the conduit 44 and the horizontal vents 42 from the drywell 40 and into the wetwell pool 26a for condensing the steam therein and thereby reducing the pressure thereof within the containment vessel 12.

The operation of the wetwell 26 is conventional, with the horizontal vents 42 being submerged under the water 36 so that a predetermined minimum level $L_2$ of the wetwell water 36 is maintained above the horizontal vents 42, i.e. above the top horizontal vent 42, to ensure effective operation of the wetwell pool 26a for receiving the steam 24a being injected therein for effective pressure suppression thereof. As the released steam 24a from the reactor 14 flows through the drywell 40 and through the conduits 44 and vents 42 into the wetwell pool 26a, the steam 24a entrains a portion of the gas, such as air or nitrogen, from the drywell 40 and carries it into the enclosed wetwell 26 wherein it is compressed in the suppression chamber 26b above the wetwell pool 26a as it accumulates therein. The respective volumes of the drywell 40 and the suppression chamber 26b are preselected to provide an adequate containment pressure margin as the air from the drywell 40 is carried with the steam 24a into the suppression chamber 26b during the LOCA, for example.

It is desirable to improve the containment pressure margin to improve pressure containment operation and/or for reducing construction costs of the reactor building 10. The larger the volume of the suppression chamber 26b, the larger the containment pressure margin therein will be since more volume is provided in which the entrained air may be compressed. However, increased volume of the suppression chamber 26b may not simply be provided by increasing either the diameter D or the height Ht of the containment vessel 12 since this would result in increased material and construction costs. And, suitable space must be provided, for example, above the wetwell 26 for the GDCS pool 38 and conventional equipment and plumbing below the top of the containment vessel 12. Furthermore, simply increasing the diameter D and the height Ht of the containment vessel 12 would also necessarily increase the volume of the drywell 40 which will then provide even more air volume which may be compressed in the suppression chamber 26b during the LOCA.

Accordingly, given the predetermined configuration and size of the containment vessel 12 for this exemplary SBWR 14, increased volume of the suppression chamber 26b is desired for improving containment pressure margin which is accomplished in accordance with the present invention without increasing either the width or the height of the wetwell 26 and, correspondingly without increasing the diameter D or height Ht of the containment vessel 12.

Figure 2:
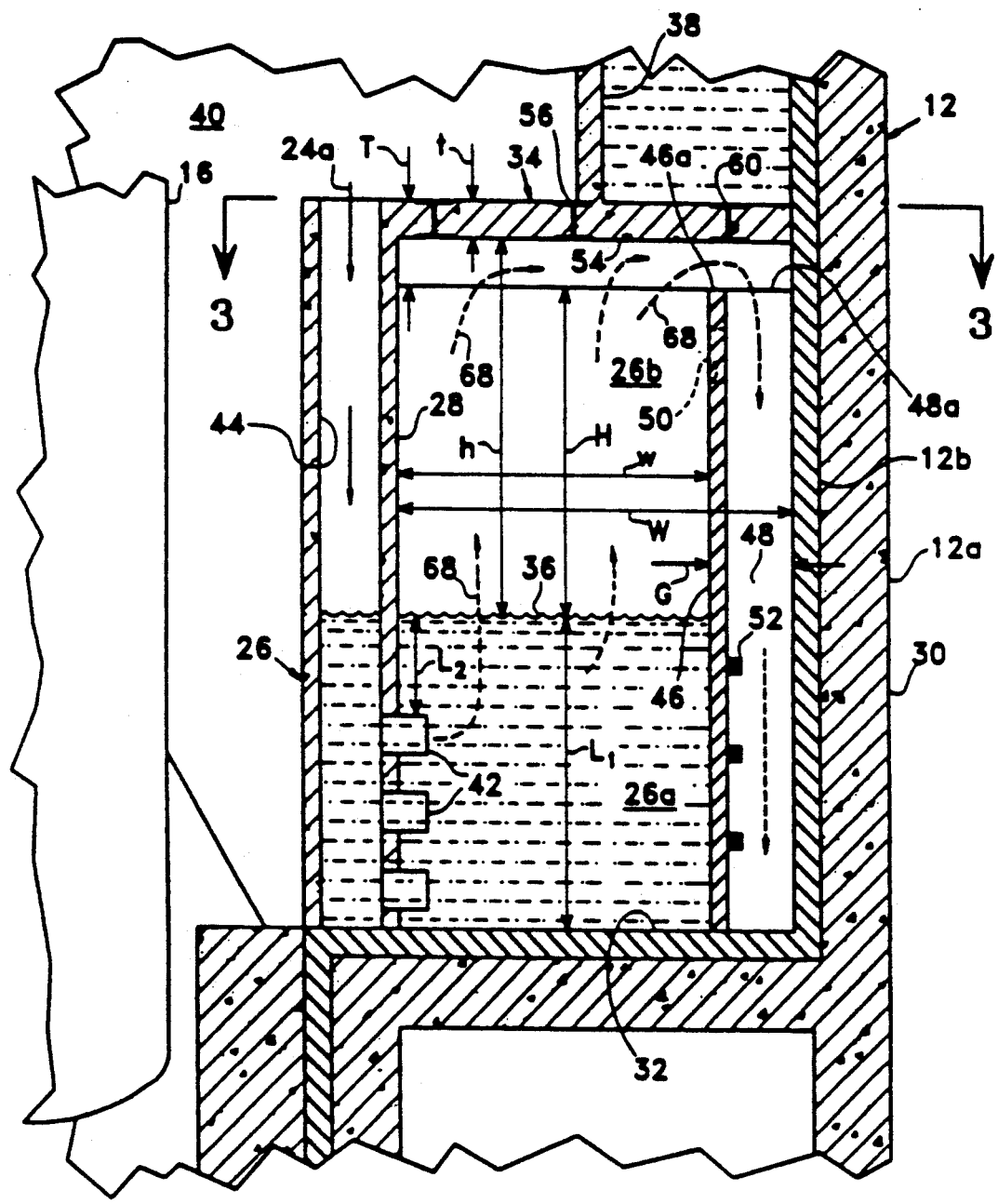
FIG. 2 is an enlarged elevational sectional view of a portion of a wetwell contained in a containment vessel within the reactor building illustrated in FIG. 1.

More specifically, and referring to FIG. 2, a portion of the wetwell 26 is illustrated and has a width W in the radial direction relative to the vertical centerline of the pressure vessel 16 and between the inner surfaces of the wetwell inner wall 28 and the wetwell outer wall 30. The height of the wetwell 26 includes the vertical height or level $L_1$ of the wetwell water 36 in the wetwell pool 26a and the height H of the suppression chamber 26b from the top of the water 36 to the bottom of the wetwell roof 34. Since the wetwell 26 is annular, its volume is defined by the product of the width W and the height H plus $L_1$, times the circumference of the wetwell 26. For the given SBWR 14 application, the outer configuration of the wetwell 26 is also preestablished which limits to provide both space for the wetwell water 36 within the wetwell pool 26a and for air within the suppression chamber 26b while still providing acceptable structural strength for accommodating the maximum design pressure.

In accordance with one embodiment of the present invention, an annular, or cylindrical, shell 46 is disposed inside the wetwell 26 and extends in part into the wetwell pool 26a to define an annular dry gap or plenum 48 which is devoid of the wetwell water 36 and is disposed in flow communication with the suppression chamber 26b. The shell 46 may take many water displacing forms including the cylindrical shell spaced radially inwardly from the wetwell outer wall 30 to define the annular dry gap 48 extending circumferentially therebetween. Alternatively, the shell 46 could also be cylindrical and spaced inwardly inside the wetwell 26 and radially outwardly from the wetwell inner wall 28 to define a similar annular dry gap therebetween (not shown). Or, the shell 46 could comprise a plurality of circumferentially spaced apart tubes (not shown) disposed near the center of the wetwell 26 generally equidistantly spaced between the inner and outer walls 28 and 30. Or, the shell 46 could be in the form of an empty torus (not shown) submerged in the wetwell pool 26a with a plurality of vertical pipes extending upwardly therefrom in flow communication with the suppression chamber 26b. Or, further, the shell 46 could include a pair of radially spaced apart walls (not shown) similarly positioned between the walls 28 and 30 all for the purpose of displacing a portion of the wetwell water 36 which would otherwise be contained in the wetwell 26 without the various embodiments of the shell 46.

Since the outer boundary of the wetwell 26 is preferably unchangeable, and since the thicknesses of the walls 28, 30, floor 32, and roof 34 must be suitable for containing the expected design pressure, additional air volume may be obtained by displacing and removing a portion of the reactor water 36 from the wetwell pool 26a attributed to the dry gap 48 formed by the shell 46 while still maintaining a predetermined minimum water level $L_2$ above the horizontal vents 42. Since the inventory of wetwell water 36 is relatively large, a relatively small percentage volume reduction thereof may be obtained for use instead in the dry gap 48 for increasing the air space associated with the suppression chamber 26b which is effective for receiving the steam entrained air from the drywell 40.

As shown in FIG. 2, the shell 46 is predeterminedly spaced radially inwardly from the outer wall 30, i.e., from the inner surface of the liner 12b thereof, to define the dry gap 48 having a thickness G. The shell preferably extends from the wetwell floor 32, or the bottom of the pool 26a, and into the suppression chamber 26b, and preferably to the wetwell roof 34. The shell 46 provides a leak-tight barrier from the bottom of the pool 26a and upwardly into the chamber 26b to prevent the wetwell water 36 from flowing into the dry gap 48. The shell 46, therefore, must necessarily displace a portion of the wetwell water 36 since the wetwell 26 has a predetermined configuration and the shell 46 is spaced inwardly from the outer wall 30. The width w between the inner wall 28 and the shell 46 is less than the width W to the outer wall 30 by the thickness G and thickness of the shell 46 itself which results in a reduced volume of the wetwell pool 26a for a given height of the wetwell water 36. For maintaining the given water height $L_1$, water must therefore be displaced and is removed from the wetwell pool 26a, and in reality is not provided therein in the first instance, so that the predetermined minimum water level $L_2$ is substantially the same with the shell 46 in place as the predetermined minimum water level $L_2$ without the shell 46 in the wetwell 26. Accordingly, the level $L_2$ above the vents 42 and the level $L_1$ of the wetwell water 36 within the wetwell 26 may be maintained at their predetermined values, with the water displaced by the shell 46 and the dry gap 48 being removed for allowing increased air space within the wetwell 26 for providing room to receive more of the entrained air from the drywell 40 than that which was available without the shell 46.

In order to dispose the dry gap 48 in flow communication with the suppression chamber 26b, the top edge 46a of the shell 46 may be positioned suitably below the lower surface of the wetwell roof 34 to provide an annular opening therebetween, or, the top edge 46a may be disposed adjacent to the bottom of the wetwell roof 34, with a plurality of circumferentially spaced apart openings 50 provided in the shell 46 as shown in phantom in FIGS. 2 and 4. Since the shell 46 instead of the liner 12b forms the outer boundary for the wetwell pool 26a, it may be conventionally sized for accommodating solely the hydrostatic pressure forces from the water 36 as well as all conventional dynamic loads including the seismic loads from sloshing of the water 36 and from movement of the shell 46 itself during a seismic event. The shell 46 is not designed to the containment vessel requirements since the outer wall 30 still provides that function. A plurality of vertically spaced apart annular stiffening ribs 52 as shown in FIG. 2 may be suitably fixedly joined to the outer surface of the shell 46, by welding for example, to provide additional structural rigidity to the shell 46 if desired.

In the preferred embodiment, however, the dry gap 48 is disposed in flow communication with the suppression chamber 26b through a lower portion of the wetwell roof 34. More specifically, and referring to FIGS. 2-4, the wetwell roof 34 preferably includes a solid or imperforate slab 54 disposed at least in part above a plurality of spaced apart support beams 56 which extend from the wetwell inner wall 28 to the wetwell outer wall 30 and are conventionally supported thereby. As shown more clearly in FIGS. 3 and 4, the beams 56 extend radially outwardly relative to the pressure vessel 16 and are preferably equiangularly circumferentially spaced apart from each other at an angle A on centers therebetween. For example, the angle A may be about 15°. The beams 56 are in the exemplary form of conventional I-beams and define therebetween an auxiliary chamber 58 disposed in flow communication with the suppression chamber 26b for further increasing the air volume in the suppression chamber 26b for further increasing the pressure margin.

Figure 4:
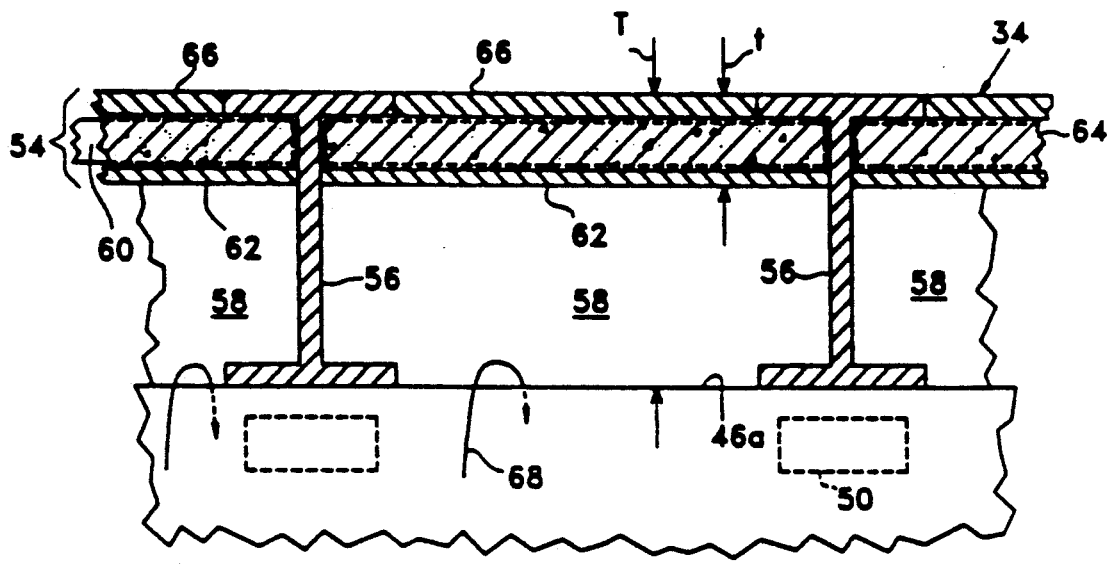
FIG. 4 is a transverse, partly sectional view of the wetwell roof illustrated in FIG. 3 taken along line 4—4.

More specifically, and as shown in FIGS. 2 and 4, the overall vertical thickness of the wetwell roof 34 is designated T, and in an exemplary embodiment is about 1.6 meters. The thickness of the conventional wetwell roof is also 1.6 meters but is conventionally a solid concrete member sandwiched between upper and lower steel plates. The conventional wetwell roof is so configured and sized for providing sufficient structural rigidity to accommodate design pressure loads within the wetwell 26 as well as supporting the GDCS pool 38 and conventional equipment thereon.

However, the improved wetwell roof 34 in accordance with the present invention has nominally the same overall thickness T as the conventional wetwell roof for providing suitable structural rigidity but is configured differently in order to provide the auxiliary air chamber 58.

Figure 3:
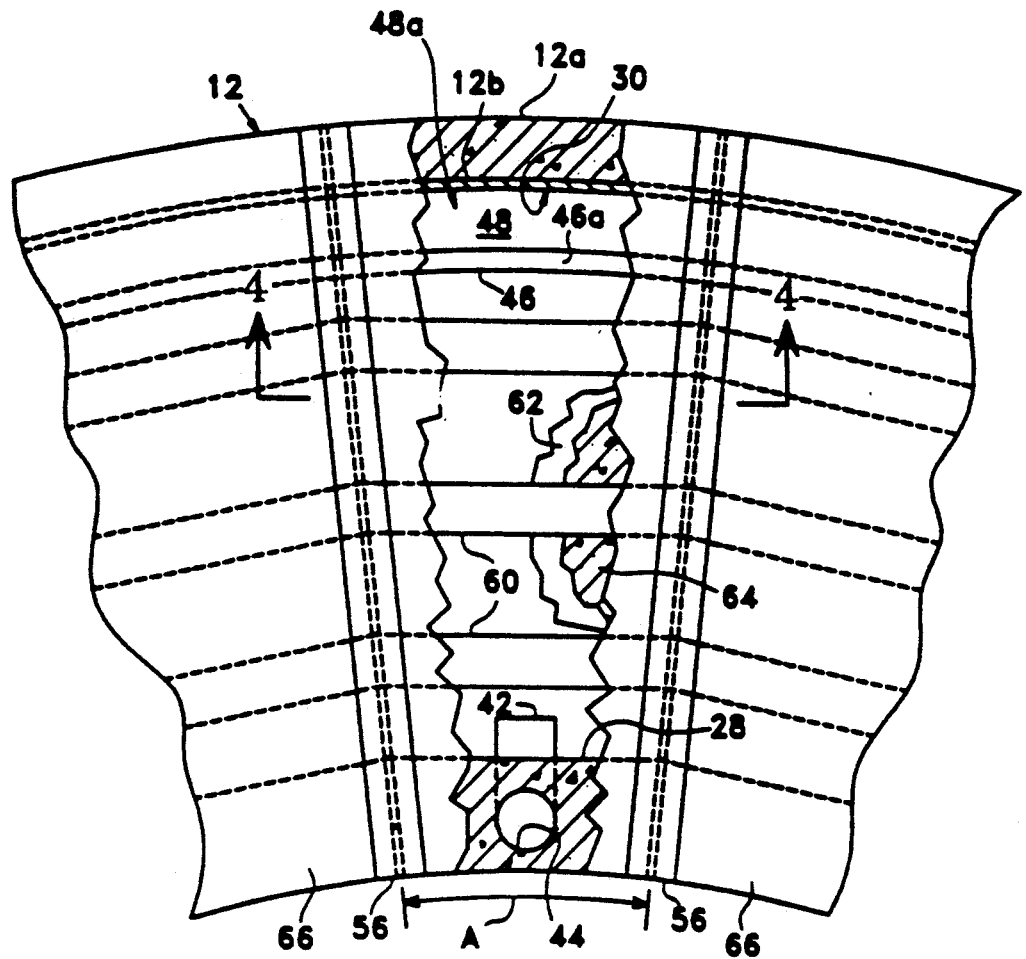
FIG. 3 is a top, partly breakaway view of a wetwell roof illustrated in FIG. 2 taken along line 3—3.

As shown in FIG. 4, the wetwell roof 34 preferably includes the support beams 56 having the thickness T, with the solid slab 54 being formed at the top ends of the beams 56. More specifically, the slab 54 includes a plurality of radially spaced apart cross beams 60, such as I-beams, conventionally fixedly joined between adjacent ones of the support beams 56 as shown in FIGS. 3 and 4. A plurality of bottom steel plates 62 are conventionally fixedly joined between the support beams 56, for example between their webs, at an intermediate position between the tops and bottoms of the beams 56 to define on their lower sides the auxiliary chamber 58, which is in the exemplary form of a plurality of such chambers each being disposed between adjacent ones of the support beams 56. The cross beams 60 and bottom plates 62 provide a frame near the top of the support beams 56 which is filled with concrete 64. A plurality of top steel plates 66 are fixedly joined between respective ones of the top flanges of the support beams 56, by welding for example, to form a planar floor surface for supporting the GDCS pool 38 and equipment thereabove (see FIG. 2).

Accordingly, the slab 54 is solid and has continuous metal upper and lower surfaces which sandwich the cross beams 60 and the concrete 64 to provide suitable structural rigidity and pressure containment for the wetwell 26. The vertical thickness of the slab 54, designated t, is suitably less than the overall vertical thickness T of the wetwell roof 34 as represented by the thickness of the support beam 56 to provide the auxiliary air chambers 58 disposed in flow communication with the suppression chamber 26b.

Accordingly, although the overall thickness T of the wetwell roof 34 is substantially equal to the completely solid conventional wetwell roof, for example about 1.6 meters, the slab 54 has a smaller thickness t, of about 0.6 meters for example, which, therefore, creates the auxiliary chambers 58 for providing increased air space within the suppression chamber 26b for increasing containment pressure margin therein.

In the preferred embodiment of the present invention, both the shell 46 forming the dry gap 48 and the improved wetwell roof 34 are used together for maximizing the amount of additional air space within the wetwell 26. For example, in one embodiment of the invention, the shell 46 may have a thickness of about 38 mm with a gap G of about 0.4 meters which in conjunction with the wetwell roof 34 described above can provide on the order of about a 20 percent increase in air volume within the wetwell 26 for improving containment pressure margin, with a reduction in volume of the wetwell water 36 of about only 6 percent.

By spacing the support beams 56 circumferentially apart as shown in FIGS. 3 and 4, the auxiliary air chambers 58 are disposed in direct flow communication with the suppression chamber 26b. As described above, the top edge 46a of the shell 46, as illustrated in FIGS. 2 and 4, may be positioned at any suitable vertical height above the wetwell water 36 to prevent the water 36 from flowing into the dry gap 48. In the preferred embodiment of the invention, the top edge 46a is spaced radially inwardly from the wetwell outer wall 30 as shown in FIGS. 2 and 3 to define an annular inlet 48a therebetween for the dry gap 48. The shell 46 preferably extends upwardly to the bottom of the support beams 56 with the top edge 46a thereof being disposed adjacent to the bottom ends of the support beams 56 as shown in FIGS. 2 and 4. In this way, the dry gap 48 is disposed in direct flow communication with the auxiliary chambers 58 which, themselves, are disposed in direct flow communication with the suppression chamber 26b. As shown in FIGS. 2 and 4, the released steam 24a is channeled through the inlet conduits 44 and the horizontal vents 42 into the wetwell pool 26a during a LOCA for example. The entrained air designated 68 is then free to fill the suppression chamber 26b, the auxiliary chambers 58, and the dry gap 48, which, due to the increased air volume provided thereby, provides more space in which the entrained air 68 may accumulate which increases the containment pressure margin.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A building for enclosing a nuclear reactor comprising:
    a containment vessel for surrounding said reactor;
    a wetwell disposed inside said containment vessel and including an inner wall, an outer wall, a floor, and a roof defining a wetwell pool, for containing wetwell water at a predetermined level from said wetwell floor, and a suppression chamber disposed above said wetwell pool;
    said wetwell and said containment vessel defining a drywell for surrounding said reactor, said drywell including a gas;
    a plurality of vents disposed in said wetwell pool and in flow communication with said drywell for channelling steam releasable in said drywell from said reactor for condensing said steam;
    a shell disposed inside said wetwell and extending into said wetwell pool to define a dry gap devoid of said wetwell water and disposed in flow communication with said suppression chamber;
    said shell being spaced from at least one of said wetwell inner and outer walls to define said dry gap;
    said shell extending from said wetwell floor and into said suppression chamber; and
    said wetwell roof comprising a slab disposed above a plurality of spaced apart support beams, said beams defining therebetween an auxiliary chamber disposed in flow communication with said suppression chamber.

2. A nuclear reactor building according to claim 1 wherein said shell extends upwardly to said support beams and said dry gap is disposed in flow communication with said auxiliary chamber.

3. A nuclear reactor building according to claim 2 wherein said shell is spaced inwardly from said wetwell outer wall to define said dry gap therebetween.

4. A nuclear reactor building according to claim 3 wherein said wetwell and said shell are annular, and said dry gap extends circumferentially therebetween.

5. A nuclear reactor building according to claim 4 wherein said support beams are equiangularly circumferentially spaced apart from each other and extend from said wetwell inner wall to said wetwell outer wall.

6. A nuclear reactor building according to claim 5 wherein said shell includes a top edge disposed adjacent to bottom ends of said support beams and spaced inwardly from said wetwell outer wall to define an annular inlet therebetween, said inlet being disposed in flow communication with said auxiliary chamber.

7. A nuclear reactor building according to claim 6 wherein said wetwell has a predetermined volume and contains said wetwell water, said wetwell water has a predetermined minimum level above said horizontal vents, and said predetermined minimum level with said shell displaying a portion of said wetwell water is substantially the same as a predetermined minimum level without said shell within said wetwell.

8. A building for enclosing a nuclear reactor comprising:
    a containment vessel for surrounding said reactor and sized for containing a maximum pressure therein;
    a wetwell of predetermined size disposed inside said containment vessel and including an inner wall, an outer wall, a floor and roof defining a wetwell pool, for containing wetwell water at a predetermined level above said wetwell floor, and a suppression chamber disposed above said predetermined level of the wetwell water in the wetwell pool of a predetermined volume such that a pressure margin between an actual pressure in the suppression chamber and the maximum pressure is maintainable;
    said wetwell and said containment vessel defining a drywell for surrounding said reactor, said drywell including a gas;
    a plurality of vents disposed in said wetwell pool and in flow communication with said drywell for channeling steam releasable in said drywell from said reactor to said wetwell pool for condensing said steam; and
    a shell disposed inside said wetwell and extending into said wetwell pool to define a dry gap devoid of said wetwell water and disposed in flow communication with said suppression chamber, said dry gap extending a vertical height substantially corresponding to the vertical height of said wetwell including said wetwell pool and said suppression chamber and at a corresponding elevation as said wetwell such that the volume of the suppression chamber is increased by said dry gap from said predetermined volume to a volume in excess thereof and the pressure margin in the suppression chamber given said actual pressure is increased without change in the sizes of the containment vessel and the wetwell.

9. A nuclear reactor building according to claim 8 wherein said wetwell roof comprises a slab disposed above a plurality of spaced apart support beams, said beams defining therebetween an auxiliary chamber disposed in flow communication with said suppression chamber.

10. A nuclear reactor building according to claim 9 wherein said shell extends upwardly to said support beams and said dry gap is disposed in flow communication with said auxiliary chamber.

11. A nuclear reactor building according to claim 8 wherein said shell is spaced inwardly from said wetwell outer wall to define said dry gap therebetween.

12. A nuclear reactor building according to claim 8 wherein said wetwell and said shell are annular, and said dry gap extending circumferentially therebetween.

13. A nuclear reactor building according to claim 8 wherein said wetwell roof comprises a slab disposed above a plurality of spaced apart support beams, said beams defining therebetween an auxiliary chamber disposed in flow communication with said suppression chamber, said support beams being equiangularly circumferentially spaced apart from each other and extending from said wetwell inner wall to said wetwell outer wall.

14. A nuclear reactor building according to claim 13 wherein said shell includes a top edge disposed adjacent to bottom ends of said support beams and spaced inwardly from said wetwell outer wall to define an annular inlet therebetween, said inlet being disposed in flow communication with said auxiliary chamber.

15. A nuclear reactor building according to claim 8 wherein said wetwell has a predetermined volume and contains said wetwell water, said wetwell water having a predetermined minimum level above said horizontal vents, and said predetermined minimum level with said shell displacing a portion of said wetwell water is substantially the same as a predetermined minimum level without said shell within said wetwell.

16. A nuclear reactor building according to claim 8 wherein said suppression chamber is sealed from said drywell.

* * * * *